United States Patent
Spodek et al.

(10) Patent No.: US 7,950,805 B2
(45) Date of Patent: May 31, 2011

(54) SYSTEMS AND METHODS FOR DISPLAYING IMAGES TO VIEWERS IN MOTION OR VIEWING FROM MULTIPLE PERSPECTIVES

(75) Inventors: Joshua Spodek, New York, NY (US); John Butziger, Livingston, NJ (US)

(73) Assignee: Submedia LLC, New York, NY (US)

( * ) Notice: Subject to any disclaimer, the term of this patent is extended or adjusted under 35 U.S.C. 154(b) by 0 days.

(21) Appl. No.: 12/744,782

(22) PCT Filed: Nov. 21, 2008

(86) PCT No.: PCT/US2008/084401
§ 371 (c)(1),
(2), (4) Date: May 26, 2010

(87) PCT Pub. No.: WO2009/070510
PCT Pub. Date: Jun. 4, 2009

(65) Prior Publication Data
US 2010/0271597 A1    Oct. 28, 2010

Related U.S. Application Data

(60) Provisional application No. 61/004,145, filed on Nov. 26, 2007.

(51) Int. Cl.
G09F 19/14    (2006.01)
G06F 15/16    (2006.01)
G03B 41/00    (2006.01)

(52) U.S. Cl. ............ 353/38; 40/454; 352/100; 359/463; 353/10

(58) Field of Classification Search .................. 359/478, 359/456, 458, 463, 466, 467; 353/7, 10, 353/38; 40/454; 352/98, 100
See application file for complete search history.

(56) References Cited

U.S. PATENT DOCUMENTS

| | | |
|---|---|---|
| 6,070,349 A | 6/2000 | Fantone |
| 6,237,264 B1 * | 5/2001 | Gulick, Jr. .................. 40/454 |
| 6,731,370 B1 | 5/2004 | Spodek et al. |
| 2010/0091367 A1 * | 4/2010 | Uehara et al. ............... 359/463 |
| 2010/0265578 A1 * | 10/2010 | Kayanuma .................. 359/463 |

FOREIGN PATENT DOCUMENTS
WO    03041038 A1    5/2003

* cited by examiner

*Primary Examiner* — William C Dowling
(74) *Attorney, Agent, or Firm* — Trenton A. Ward, Esq.; Troutman Sanders LLP (57) ABSTRACT

Systems and methods for displaying images to viewers in motion are provided. According to some embodiments, an image display system generally comprises an image source and a lensboard. The image source can be configured to present one or more images outwardly from the image source. The lensboard can comprise at least one curved lens. The curved lens can have a generally curved cross section and a focal distance. The curved lens may also be a cylinder. The lensboard can be spaced apart from the image source at a distance less than the focal distance. A method to display images that appear animated to a viewer in motion relative to the can generally comprise providing an image source configured to direct one or more images outwardly from said image source, and providing a lensboard having a focal distance spaced apart from the image source at a distance less than the focal distance. Other aspects, features, and embodiments are also claimed and described.

18 Claims, 10 Drawing Sheets

SYSTEMS AND METHODS FOR DISPLAYING IMAGES TO VIEWERS IN MOTION OR VIEWING FROM MULTIPLE PERSPECTIVES

BENEFIT CLAIMS

This application is a US National Stage of International Application No. PCT/US2008/084401 filed 21 Nov. 2008, which claims the benefit of U.S. Ser. No. 61/004,145, filed 26 Nov. 2007.

CROSS REFERENCE TO RELATED APPLICATION & PRIORITY CLAIM

This application claims priority to and the benefit of U.S. Provisional Patent Application No. 61/004,145 filed 26 Nov. 2007, which is incorporated herein by reference in its entirety as if fully set forth below.

TECHNICAL FIELD

The various embodiments of the present invention relate generally to displaying images and more particularly to systems, methods, and apparatuses configured to display images that appear animated to a viewer who is in motion relative to the still images or provide different views from different viewing angles and perspectives.

BACKGROUND

Conventional display devices that display still images appearing to be animated to a viewer in motion are known. These devices include a series of graduated images—that is, adjacent images that differ slightly and progressively from one image to the next (or groups of identical images that differ groupwise slightly and progressively from one group to the next). The images are arranged in the direction of motion of a viewer, for example along a railroad or sidewalk, such that the images are viewed consecutively. As a viewer moves past these images, they appear animated. The effect is similar to that of a flip-book. A flip book has an image on each page that differs slightly from the one before it and the one after it such that when the pages are flipped, a viewer perceives animation. Traditional linear zoetropes (named from the Greek "zoe-," life, and "-trope," cycle; hereafter zoegraphs, from the Greek "graph," line) have seen widespread commercial implementation.

Existing methods for displaying animated images involves relative motion between the viewer and device are spherical-lens based and cylindrical-lens based systems described in U.S. Pat. No. 2,833,176 and U.S. Pat. No. 3,568,346. These devices (hereafter, lenticular zoegraphs) use lenses placed between viewers and the series of graduated images to cause an animation effect.

Alternatively, zoegraphs can display still images showing different perspectives of the same view using a series of graduated image. For example if a graduated image showed an object viewed from one perspective and each subsequent graduated image showed the same object viewed from how that object would appear to a viewer at the appropriate position to see that graduated image, the viewer would have the effect of seeing that object in three dimensions. This use of a zoegraph may be referred to herein as a "3D Projection" technique. Because the net effect of the 3D Projection technique is to use the same apparatus to show a changing picture to a changing vantage point, for simplicity, the term "motion" may be used in the context of a viewer viewing a zoegraph to describe both the traditional zoegraph effect and the 3D projection effect.

A typical lenticular zoegraph is an apparatus for displaying multiple still images, forming an animated display, to a viewer moving at a substantially known velocity relative to these still images along a known trajectory parallel to these still images. The velocity may be fixed or may vary over the length of the apparatus. A typical lenticular zoegraph includes a backboard, on which are mounted or displayed the still images. A lensboard, consisting of a series of spherical or cylindrical lenses, is positioned parallel to the backboard. Each lens corresponds to one of the images. The whole apparatus is mounted at a viewing distance from the trajectory. In cylindrical lenticular zoegraphs, in order that each image appear in the correct proportion to the viewer, the actual image width is selected to be the product of the desired apparent image width and the quotient of the board-to-board distance and the viewing distance. In spherical lenticular zoegraphs, the actual image height is selected to be the product of the desired apparent image height and the quotient of the board-to-board distance and the viewing distance and the actual image width is selected to be the product of the desired apparent image width and the quotient of the board-to-board distance and the viewing distance.

Lenticular zoegraphs meet a demand to communicate messages to viewers in motion. Messages for which there is demand to communicate to viewers in motion include informative messages about what is ahead in the viewers' paths and advertising. Messages presented to viewers in motion without such devices may not be seen or may appear as an incomprehensible blur. Systems using technologies other than lenticular zoegraphs have met this need—for example, traditional zoegraphs and strobe-based systems, both of which types of systems have enjoyed widespread commercial success. Lenticular zoegraphs offer several advantages in certain environments relative to traditional zoegraphs and strobe-based systems. Nonetheless, lenticular zoegraphs have seen significantly less commercial exploitation than traditional zoegraphs or strobe-based systems. It would be advantageous to create apparatuses that overcome shortcomings of existing zoegraph technologies.

Relative to traditional zoegraphs, lenticular zoegraphs require little or no lighting and show coherent images when the viewer is stationary. Traditional zoegraphs use slits in an otherwise opaque screen between the viewer and series of graduated images to create the animation effect. Blocking the light not passing through these slits decreases the brightness of the animated images, typically by over 90%, requiring additional lighting, which contributes to manufacturing and operating costs and complexity.

Not blocking so much light from the images, enables lenticular zoegraphs to operate with substantially less bright light sources than traditional zoegraphs, including screens such as televisions, computer monitors, projections from image projectors, or other forms or digital or analog images (collectively, "conventional display screens"). Many conventional display screens have two relevant advantages over printed media, which have previously been used in traditional and lenticular zoegraphs. One, the images they display can be transmitted remotely, for example broadcast, like television, or by cable, like a computer monitor. Two, the images they display can be changed without changing any hardware. Therefore, using conventional display screens enables images to be changed remotely and at arbitrary times. In the context of screens with these properties, the term "still images" is to be understood to mean that each particular image does not change during the time the viewer is substantially in front of that particular image.

Relative to strobe-based systems, lenticular zoegraphs require neither synchronization with the viewer's speed or position nor significant, if any, additional lighting or complex lighting systems capable of strobing. Moreover, lenticular zoegraphs create animation at lower speeds and show coherent images to stationary viewers. Strobe-based systems use strobe lights that flash briefly to create the animation effect. The shortness of the flashes requires precise knowledge of the position and speed of the viewer. Typically, strobe-based systems include sensors and timing mechanisms to synchronize the flashing of the strobe lights with the viewer's position and speed. The synchronization and lighting requirements contribute to manufacturing and operating costs and complexity.

Despite being able to operate without some of the constraints of traditional zoegraphs or strobe-based systems, conventional lenticular zoegraphs suffer limitations of their own and have seen little successful commercial implementation relative to zoegraph or strobe-based systems. Drawbacks of conventional lenticular zoegraphs include:

- They require placing the images in the focal plane of the lenses. Placing an image in the focal plane of a lens deteriorates the image quality.
- As a result, the distance between the lensboard and the backboard must be very precisely maintained or the image will appear distorted, deteriorating the image quality. Current systems provide no inherent way to maintain this distance precisely. In practice, it is very difficult to maintain the images precisely in the focal plane.
- Parts of images that are not directly along the axis of the lens appear distorted relative to parts of the image along the axis, deteriorating the image quality.
- Replacing the series of images with another series of images requires mechanically removing the series of images to be replaced with a new series of images replacing them. This replacement requires recurring on-site labor, printing of new images, and precision placement of the new series of images, each contributing cost and complexity.

In view of the foregoing, it is desirable to provide improved systems and methods for displaying images to viewers in motion. It is also desirable to provide new systems and methods for displaying animations to viewers viewing from different perspectives. For example, changing images at a frame rate high enough to create a motion picture effect enables a viewer to view an animation through a lenticular zoegraph with a changing screen displaying the images without moving. This effect can be useful when using a 3D Projection technique to show 3D animations. It is to the provision of such systems and methods that embodiments of the present invention are directed.

SUMMARY OF EXEMPLARY EMBODIMENTS

It has been discovered that various advantages may be realized by the present system and method for displaying still images that appear animated to a viewer who is in motion relative to the still images. Embodiments of the present invention provide a method and apparatus to display still images that appear animated to a viewer in motion relative to the still images, which minimizes unnecessary cost or complexity, and maintains image quality and applicability.

In accordance with some embodiments of the present invention, there is provided apparatus for displaying multiple still images, forming an animated display to a viewer moving substantially at a known velocity relative to the still images. The velocity may be fixed or may vary over the length of the apparatus. The apparatus can also show a coherent image to a stationary viewer. The apparatus includes a backboard having a backboard length along the trajectory. The still images are mounted on a surface of the backboard, with each of the still images having an actual image width and having an image center. An alternative configuration includes conventional display screens showing still images mounted so their surfaces form a backboard. The images can also be made up of any combination of digital and analog images. Image centers of adjacent images are separated by a frame-to-frame distance. A lensboard is positioned substantially parallel to the backboard, facing the surface thereof and separated therefrom by a board-to-board distance. The lensboard is mounted at a viewing distance from the trajectory. The board-to-board distance and the viewing distance total a backboard distance. The lensboard has a lensboard length along the trajectory, and has multiple cylindrical lenses substantially perpendicular to the lensboard length. An alternative configuration has columns of spherical lenses with columns of images on the backboard or conventional display screens.

Each lens corresponds to one of the images and has a lens center, respective lens centers of adjacent ones of the lenses being separated by the frame-to-frame distance. In order to display each image with an apparent image width, the board-to-board distance, the viewing distance, and the actual image width are selected so that the product of (a) the actual image width and (b) the quotient of (i) the viewing distance and (ii) the board-to-board distance substantially equals the apparent image width.

Though the present description adopts the terminology of other patents with respect to the shape of lenses—in particular, the terms "spherical" and "cylindrical"—it is to be understood that the edges of the lenses of the present invention need not be strictly spherical or circular in cross section. For example, lenses with non-spherical or non-circular cross sections may be used in the place of strictly spherical or circular-cross-section lenses to correct for spherical aberration. Also for example, Fresnel-type lenses may be used, as well.

Also in accordance with some embodiments of the present invention, there is provided apparatus for displaying multiple columns of still images, forming an animated display to a viewer moving substantially at a known velocity relative to the still images. The velocity may be fixed or may vary over the length of the apparatus. The apparatus can also show a coherent image to a stationary viewer. The apparatus includes a backboard having a backboard length along the trajectory. The columns of still images are mounted on a surface of the backboard, with each of the columns of still images having an actual image width and having an image center. An alternative configuration includes conventional display screens showing still images mounted so their surfaces form a backboard. The images can also be made up of any combination of digital and analog images. Image centers of adjacent columns of images are separated by a frame-to-frame distance.

In some embodiments, a pinholeboard can be positioned substantially parallel to the backboard, facing the surface thereof and separated therefrom by a board-to-board distance. The pinholeboard is mounted at a viewing distance from the trajectory. The board-to-board distance and the viewing distance total a backboard distance. The pinholeboard has a pinholeboard length along the trajectory, and has multiple pinholes regularly spaced along the lensboard length. Each pinhole corresponds to one of the images and has a pinhole center, respective pinhole centers of adjacent columns of which pinholes being separated by the frame-to-frame distance. In order to display each image with an apparent image width, the board-to-board distance, the viewing distance, and the actual image width are selected so that the product of (a) the actual image width and (b) the quotient of (i) the viewing distance and (ii) the board-to-board distance substantially equals the apparent image width. Such apparatuses will hereafter be called pinhole zoegraphs.

A pinhole zoegraph shares many properties with the spherical lenticular zoegraph from the perspective of a viewer. Relative to the spherical lenticular zoegraph, the pinhole zoegraph has several advantages, including more rugged and durable construction, since the pinholeboard may be constructed of stronger materials than a lensboard. Another advantage is that the pinhole zoegraph does not require as high precision in the placement of the backboard relative to the pinholeboard as the spherical lenticular zoegraph does with its backboard and lensboard. In some embodiments, the pinhole zoegraph may cut off significant amounts of light from the backboard. Thus, the pinhole zoegraph may require internal lighting.

Broadly described, some embodiments of the present invention provide an apparatus for displaying images to viewers. An apparatus embodiment can generally comprise a backboard and an optics board. The backboard can be configured to carry one or more static or dynamic images. The optics board can comprise one or more optical elements. The optical elements can have a one-to-one correspondence with one of the one or more static or dynamic images. The optics board can be set off (or spaced apart) from the backboard at a distance less than the focal distance of the one or more optical elements. In some embodiments, the optics board can be one a lensboard comprising one or more cylindrical lenses as the optical elements or a pinhole board comprising one or more pinholes as the optical elements. In some embodiments, the backboard can be configured to be curved horizontally, vertically, or a combination thereof. Also, the optics board can be configured to have a curvature corresponding to the backboard.

Apparatus embodiments can also have other features in accordance with some embodiments. For example, an apparatus can comprise a network interface (e.g., internet network interface) to provide images to a backboard such that the images can be changed at a location remote from the backboard. Another feature includes having an optics board that comprises one or more lenses having a non-circular cross-section as optical elements. Also, another feature includes configuring one or more cylindrical lenses as columns of spherical lenses and the one or more static or dynamic images being configured as columns of images. In some embodiments, the distance between the backboard and the optics board can be substantially zero. Also, in some embodiments, an optics board can be configured as multiple lensboards or a lensboard comprising a matrix of individual lenses.

Embodiments of the present invention can also be provide an image display system. Such systems may generally comprise an image source and a lensboard. The image source can be configured to present one or more images outwardly from the image source. The lensboard can comprise one or more cylindrical lenses, each having a focal distance. The lensboard can be spaced apart from the image source at a distance less than the focal distance of the lenses. Also, each of the lenses can have a one-to-one correspondence with one of the one or more images presented outwardly from the image source.

In some embodiments, the image source can have various features. For example, in some embodiments, the image source can be a static or a dynamic image. Also in some embodiments, the image source can comprise a display screen and be operatively coupled to a network and configured to receive image information from the network for display on the display screen. In still yet some embodiments, the image source being connected to the internet such that images displayed outwardly from the image source can be modified at a location remote from the image source. Also, the image source can be configured to project images stored in a local memory such that images directed outwardly from the image source can be controlled at the image source. As another example, the image source can be curved in a horizontal configuration, vertical configuration, or a combination thereof.

Image display systems can also comprise additional features. For example, a lensboard can comprise one or more lenses having a non-circular cross-section. Also, a backboard configured to be curved horizontally, vertically, or a combination thereof and the lensboard configured to have a curvature corresponding to the backboard. In addition, a lensboard can also comprise a plurality of curved lenses having at least one of a circular cross section or elliptical cross section.

Still yet other embodiments of the present invention can comprise an apparatus for displaying images to viewers. According to some embodiments, such an apparatus can generally comprise a backboard and a lensboard. The backboard can have a front backboard side, and the backboard can be configured to carry one or more images. The lensboard can be situated an object distance away from the front backboard side of said backboard. The lensboard can also comprise a plurality of cylindrical lenses. Each of the lenses can have a one to one correspondence to one of the one or more images. Also, the lensboard can have a front lensboard side, a rear lensboard side, and a focal plane located a focal distance from the appropriate principal plane contained within the lensboard, said focal distance being greater than said object distance.

Image displaying apparatus embodiments of the present invention can also include additional features. For example, the utilized lenses can be cylindrical lenses, or elliptical lenses shaped to reduce or eliminate aberrations. Also, portions of a utilized backboard (e.g., a front backboard side) can be curved. In addition, the distance between the back of a lensboard and the front backboard side can be zero. And in some embodiments, the backboard can be a digital display (e.g., high definition digital monitor or standard definition digital monitor).

Embodiments of the present invention also include method embodiments. For example, some method embodiments can be used to display images that appear animated to a viewer in motion. Such a method can generally comprise providing an image source configured to display one or more and providing a lensboard. A provided lensboard can comprise at least one cylindrical lens that satisfies the lens equation. The lensboard can have a focal distance and be spaced apart from the image source at a distance less than the focal distance with a one-to-one correspondence between images and lenses. A method can also comprise providing the lensboard with a plurality of lenses. In addition, a method can also comprise configuring an image source to provide at least one of static or dynamic images. Still yet, a method can include coupling an image source to a network and configuring the image source to receive image information from the network for display on the display screen. Also, some method embodiments can include connecting an image source to a network such that images displayed outwardly from the image source can be modified at a location remote from the image source.

Method embodiments according to the present invention may also include additional features. For example, some methods can include providing an image source with a memory and configuring the image source to project images from the memory such that images directed outwardly from the image source can be controlled at the image source. In addition, a method can include providing a lensboard with a plurality of curved lenses positioned adjacent at least one other curved lens such that an outer surface of the lensboard is configured as a series of curved surfaces. In some embodiments, a method can comprise providing a lensboard with a plurality of curved lenses configured in a horizontal arrangement. A method can also include providing a lensboard with a plurality of curved lenses having at least one of a circular cross section or elliptical cross section. Still yet, a method can include providing an image source in a horizontal configuration, vertical configuration, or a combination thereof. Also, a method can include configuring a distance between the backboard and lensboard to be substantially zero.

In still yet other embodiments of the present invention, an image display system can generally comprise an image source and a pinholeboard. The an image source can be configured to present a plurality of images outwardly from the image source. Also, the pinholeboard can comprise a plurality of pinholes, each of the pin holes having a one-to-one correspondence with a respective one of the plurality of images presented outwardly from the image source.

Other aspects and features of embodiments of the present invention will become apparent to those of ordinary skill in the art, upon reviewing the following description of exemplary embodiments in conjunction with the accompanying figures. While features of the present invention may be discussed relative to certain embodiments and figures, all embodiments of the present invention can include one or more of the advantageous features discussed herein. Thus, while one or more embodiments may be discussed as having certain features, one or more of such features may also be used in accordance with other embodiments. In similar fashion, while embodiments may be discussed below as device, system, or method embodiments such exemplary embodiments can be implemented in various devices, systems, and methods.

BRIEF DESCRIPTION OF THE DRAWINGS

The above and other embodiments, objects, features, and advantages of the present invention will be apparent upon consideration of the following detailed discussion, taken in conjunction with the accompanying drawings, in which.

DETAILED DESCRIPTION OF PREFERRED & ALTERNATIVE EMBODIMENTS

Embodiments of the present invention provide an apparatus operating on principles of geometric optics that displays animation to a viewer who is in motion relative to it. In some embodiments, an apparatus optimally animates images to a viewer who is moving in a substantially predictable path at a substantially predictable speed. There are many common instances that meet this criterion, including, but not limited to, riders on subway trains, pedestrians on walkways or sidewalks, passengers on surface trains, passengers in motor vehicles, passengers in elevators, and the like. Advantages of embodiments of the present invention include:

Provides consistent image quality along a range of lines of sight in the directions toward and away from the viewer's direction of motion.

Provides consistent image quality along a range of lines of sight in the directions perpendicular to the viewer's direction of motion.

Minimizes the need for mechanical or on-site replacement of the series of images.

Provides an inherent way to avoid the necessity of precisely maintaining the distance between the lensboard and the backboard.

In some embodiments, an apparatus preferably includes a series of graduated pictures ("images" or "frames") spaced at preferably regular intervals and, preferably between the pictures and the viewer, an optical arrangement that focuses the viewer's view on a thin strip of each picture. This optical arrangement preferably is composed of a series of thin, converging lenses in it, oriented with the long dimension of the lenses perpendicular to the direction of the viewer's motion. The series of pictures will generally be called a "backboard" and the preferred optical arrangement will generally be called a "lensboard." Various exemplary embodiments invention will now be described below with reference to FIGS. 1 to 14.

Figure 1:
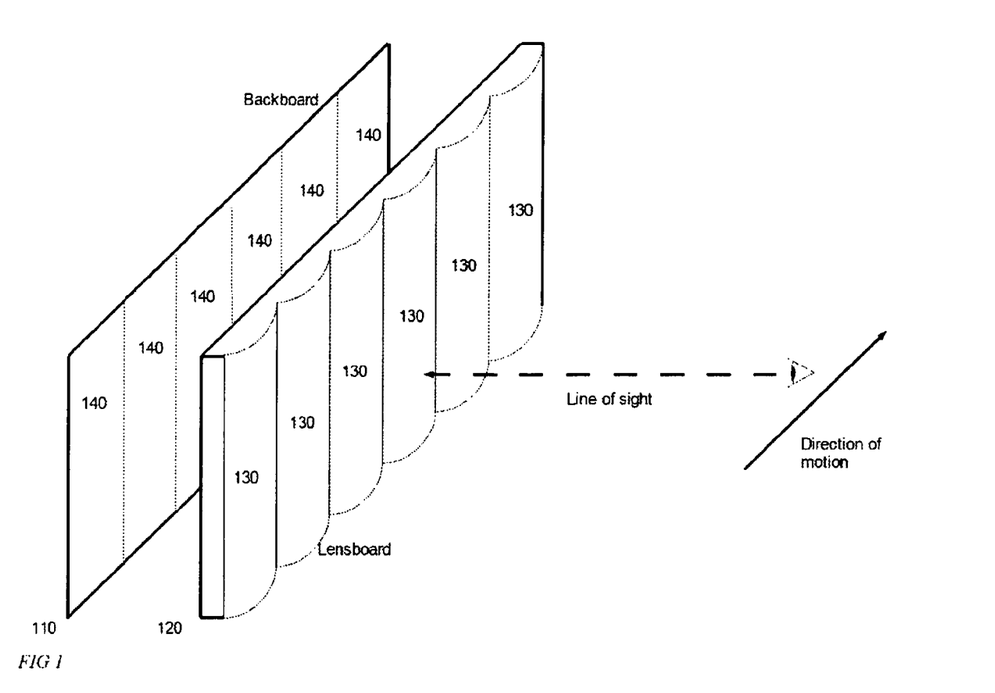
FIG. 1 is a schematic perspective view of a plurality of adjacent images on a prior art backboard and corresponding cylindrical lenses.
Figure 2:
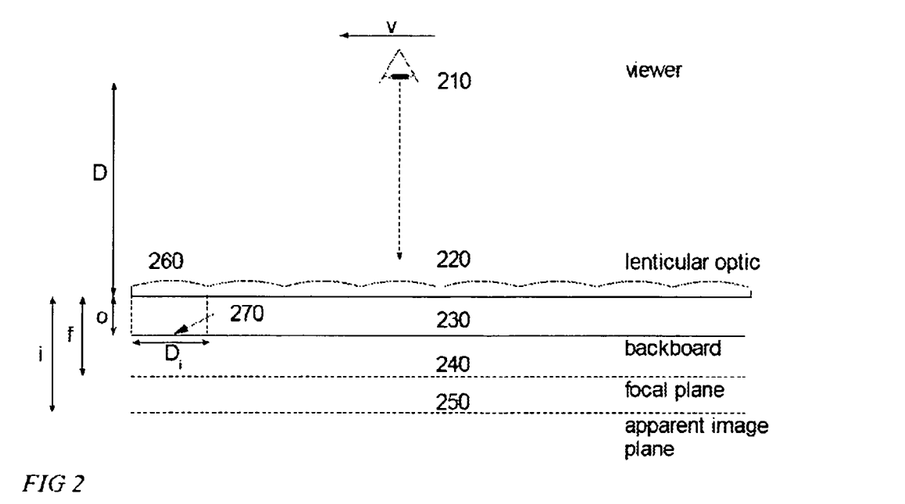
FIG. 2 is a schematic cross-section of an embodiment of the present invention, indicating several components, dimensions, and optical properties.

The basic elements of a preferred embodiment of a display apparatus according to the present invention is shown in FIG. 1 and FIG. 2. In this embodiment, the apparatus is essentially two components, a backboard 110 and a lensboard 120. Preferably, but not required or pictured, are housing elements, to hold the backboard 110 and lensboard 120 in place and to keep foreign matter out, and a source of illumination. The lensboard 120 preferably includes multiple cylindrical lenses 130 as described in more detail below. The backboard 110 preferably includes multiple still images 140.

The following variables may be defined from FIG. 2:
D=distance from viewer 210 to lensboard 220
o=distance from lensboard 220 to backboard 230
f focal length of single lens 260
i=distance from lensboard 220 to apparent image of backboard 250
$D_i$=actual width of a single image 270
v=speed of viewer 210 relative to apparatus Another parameter, which is not labeled, will be described below: $D_i'$, the apparent or perceived width of a single image.

A departure of the present invention from previously known lens-based apparatus designed to be viewed by viewers in motion is that the images are not placed at the focal plane of the lenses. This contrasts with known systems for lens-based apparatus, which teach and claim that images be in the focal plane of the lenses. U.S. Pat. No. 2,833,176 teaches, for example, that, "it is a fundamental requirement that, optically, the second component of each one of the cells of the screen [that is, the images] be placed in the focal plane of the first [that is, the lens], or in its immediate vicinity." U.S. Pat. No. 2,833,176 further claims, "a supporting frame [the backboard]mounted behind said lenses with its surface in the focal plane thereof." U.S. Pat. No. 3,568,346 teaches, "each of the optical objects [that is, the images] being in the focal plane of the lens with which it is in registry . . . images appear to be at infinity."

Goals of conventional, prior display systems and embodiments of the present invention are different. The goal of prior systems is to focus visual rays on individual points or lines on the images. A goal of the present system is to focus visual rays on slices of finite width and to magnify them. Therefore, as indicated in FIG. 2, the backboard is placed at distance o from the lensboard, where o is less than the focal length, f, of the lens.

The well known thin lens equation, $$\frac{1}{i} \square \frac{1}{o} = \frac{1}{f},$$

available in introductory optics texts, gives the relation between the object distance, o and image distance, i for a lens of focal length, f. Since prior art places images in the lenses' focal plane, equivalent to setting o equal to f, prior art also teaches that the image appears at "optical infinity," equivalent to i equal to infinity. In the present invention, o is less than f, and i is finite, typically within an order of magnitude of f. That is, the image of the present invention appears at a finite distance, not at optical infinity.

When an object is placed a distance less than the focal length of a lens, the lens produces a virtual image at an apparent distance from the lens, which is found by solving the thin lens equation. The image appears magnified by a factor of m, where $$m = -\frac{i}{o}.$$

Thus, the image appears to a viewer to have an apparent width, $D_i'$, given by $D_i' = mD_i$.

In the case of a cylindrical lens in the present invention, the magnification is only in the direction of motion.

The apparatus according to an embodiment of the present invention utilizes persistence of vision, whereby a viewer perceives a continuous moving image when shown a series of discrete images. The operation of some embodiments of the present invention use two distinct, but simultaneous, manifestations of persistence of vision. The first occurs in the eye reconstructing a full coherent image, apparently entirely visible at once, when shown a series of small slivers of the images that sweep over the whole image. The second is the usual effect of the flip-book, whereby a series of graduated images is perceived to be a continuous animation.

Figure 3:
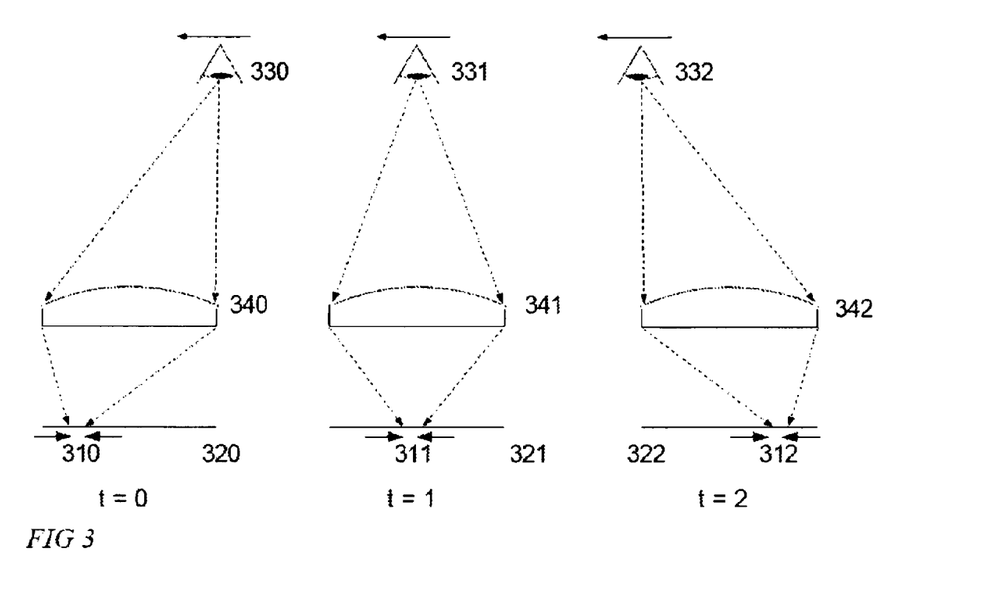
FIG. 3 is a schematic cross-section of an embodiment of the present invention, indicating the view of the apparatus by a moving viewer.

FIG. 3 illustrates the first persistence of vision effect. It shows three consecutive points in time (t=0, 1, 2). Considering moment t=1 for simplicity, viewer 331 views sliver 311 of image 321 through single lens 341. Just before, at t=0, viewer 330 saw sliver 330 of image 320 through single lens 340. In other words, in time the visible sliver of an image sweeps over the whole image. This diagram shows that viewer 331, over a short period of time, eventually sees each part of the image 321. However, at any given instant only a thin sliver 311 of the image 321 is visible, as in a traditional zoegraph. When not moving, viewer 331 sees adjacent slivers 311 of images magnified through adjacent lenses, for example, adjacent lens 340 and adjacent lens 342, which collectively look like a single, coherent image. In motion, viewer 331 sees an animation.

The effect produces animation at arbitrarily high speeds because at higher speeds the period of time over which the sliver is visible shortens, and therefore the motion of the image viewed through the lens in that time grows smaller, the viewer perceives less or no blur. There is no theoretical upper limit on the speed at which the apparatus works. That is, the effect that would cause blur—the viewer's increased speed—is canceled by effect that reduces blur—the period of viewability of a given sliver.

In FIG. 3 the representation of movement of the viewer's 331 line of sight is purely illustrative. In practice the viewer's gaze may be fixed at what appears to be a stationary screen and the entirety of the frame can be seen through peripheral vision, as with a conventional display apparatus, such as a billboard.

The two persistence of vision effects operate simultaneously in practice. Above a minimum threshold speed, the viewer 331 perceives neither discrete images nor discrete slivers. While the term sliver has been employed in the description, it is not required that the portion of the image be extremely narrow to fall within the scope of the present invention.

As with traditional zoegraphs, the present invention also makes actual images appear larger in the direction of the viewer's motion, an effect described here as a stretching effect, which is distinct from the lens magnification. The magnitude of the stretching effect, s, is given by $$s = \frac{D}{f}.$$

A property of embodiments of the present invention is that both the magnification and stretching effect occur simultaneously and both produce a similar effect: the elongation of the actual images along the axis of the viewer's motion. The two effects scale differently with distance, with the result that there is an optimal viewing distance, OVD, at which the magnitudes of the magnification and stretching effects coincide. This occurs when OVD=mf.

In practice, in order that apparent images appear with correct proportions, one may pre-shrink the actual images in the direction of motion so that the stretching and magnification effects make the stretched and magnified images have correct proportions.

Unlike traditional zoegraphs, where typically over 90% of the viewer's gaze falls on the opaque space between slits, in the present invention, virtually no part of the display blocks light; the lensboard only redirects it. As a result, traditional zoetropes require the viewer to move relative to them to perceive a coherent image. Embodiments of the present invention require no minimum viewer speed to perceive a coherent image. Indeed, embodiments of the present invention can typically operate without additional lighting, though it can optionally use additional lighting.

Figure 4:
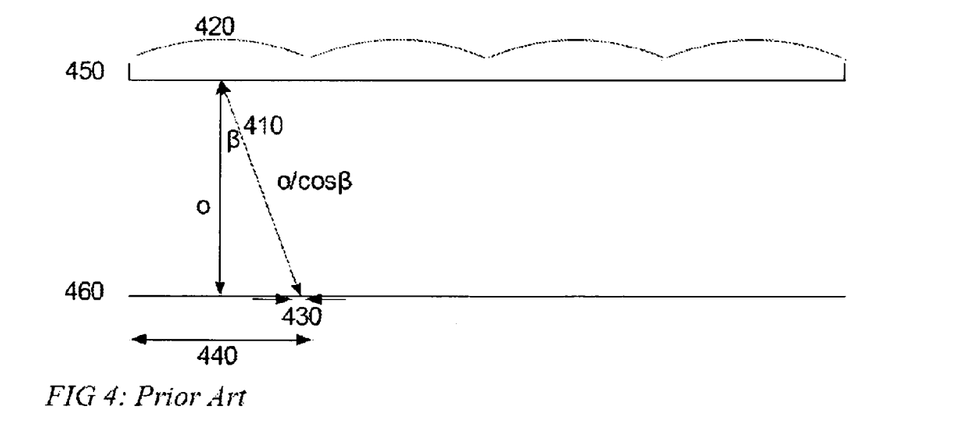
FIG. 4 is a schematic cross-section of a prior art backboard and lensboard, indicating the different distances from the lens center to points along the backboard away from the optical center in the direction of the viewer's motion.

FIG. 4 schematically illustrates a shortcoming of the prior art, that at different viewing angles 410 to the left and right in the illustration the effective distance between an individual cylindrical lens 420 and the slice 430 of the image 440 being viewed through that cylindrical lens 420 changes. In particular, if at normal incidence the distance between the lensboard 450 and the slice 430 of the image 440 viewed at that angle 410 is o, then when angle 410 equals β the distance between the lensboard 450 and the slice 430 of the image 440 viewed at that angle 410 is o/cos β, which is greater than o for any nonzero β This change in distance with viewing angle 410 results in degradation of image quality. A given image that appears in focus or with a given magnification in front of the viewer may appear out of focus or to have a different magnification to the left and right of center in this embodiment.

Figure 5:
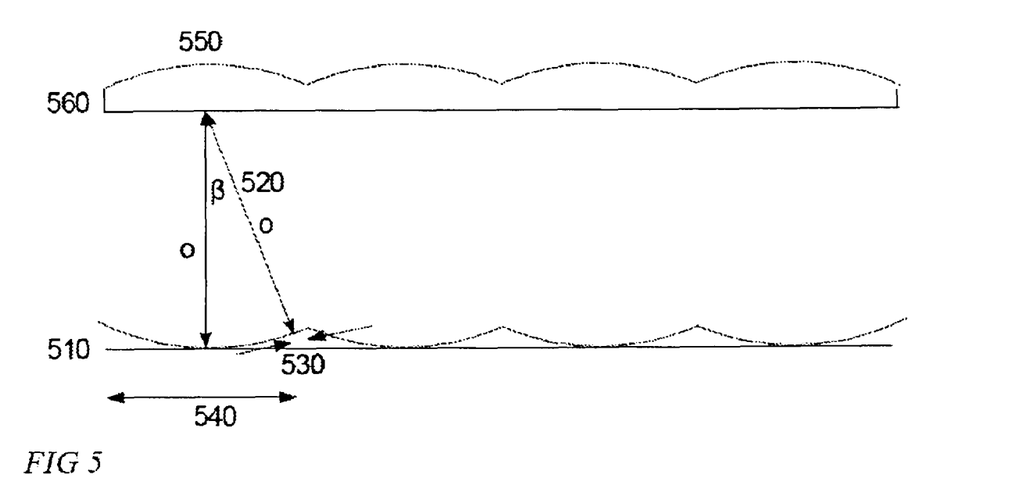
FIG. 5 is a schematic cross-section of a curved backboard and lensboard of an embodiment of the present invention, indicating the different distances from the lens center to points along the backboard away from the optical center in the direction of the viewer's motion.

FIG. 5 schematically illustrates an embodiment of the present invention, in which a non-flat backboard 510 improves the image quality relative to prior art at viewing angles 520 away from normal incidence. The curved backboard 510 of the can maintain a more constant distance between a lens 550 and the slice 530 of an image 540 viewed at a given angle 510 along the viewer's line of sight. Though FIG. 5 illustrates a backboard 510 curve that is circular, the curve need not be circular, but could have other shapes that bring the edges of the image 540 closer to the lensboard 560. In practice, any bringing forward of the edges that reasonably approximates a circle improves the image quality, though other shapes may reduce manufacturing or operational costs, for example a triangular cross section.

Figure 6:
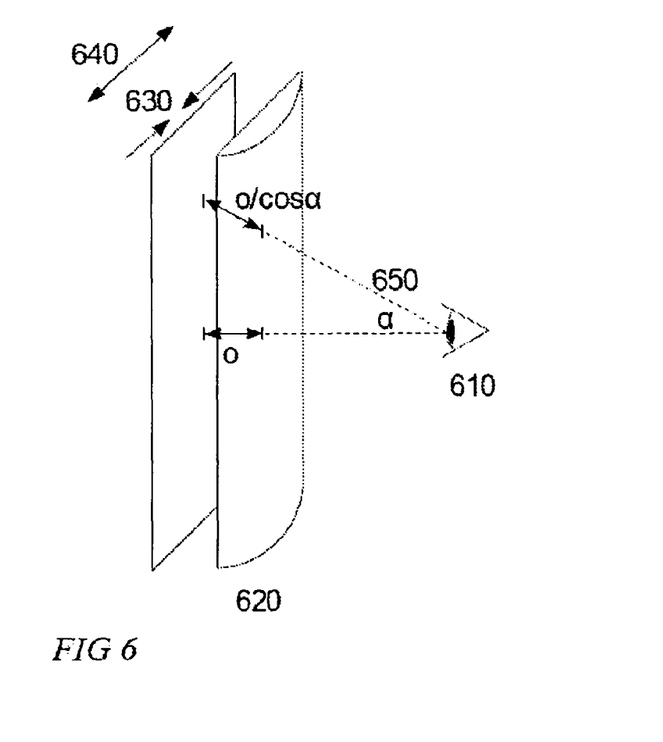
FIG. 6 is a perspective view of a single image on a prior art backboard and a corresponding lens, indicating the different distances from a viewer's horizontal line of sight and points along the backboard above and below the viewer's horizontal line of sight.

FIG. 6 schematically illustrates a shortcoming of the prior art, that at different viewing angles 650 above or below a line drawn perpendicularly from the viewer 610 to the lensboard 620 in the illustration the effective distance between an individual cylindrical lens 620 and the slice 630 of the image 640 being viewed through that cylindrical lens 620 changes. In particular, if at normal incidence the distance between the lensboard 620 and the slice 630 of the image 640 viewed at that angle 650 is o, then when angle 650 equals α, the distance between the lensboard 620 and the slice 630 of the image 640 viewed at that angle 650 is o/cos α, which is greater than for any nonzero α. This change in distance with vertical viewing angle 650 results in degradation of image quality. A given image 540 that appears in sharp focus or with a given magnification in front of the viewer may appear out of focus or with a different magnification above or below the center in this embodiment.

Figures 7, 8:
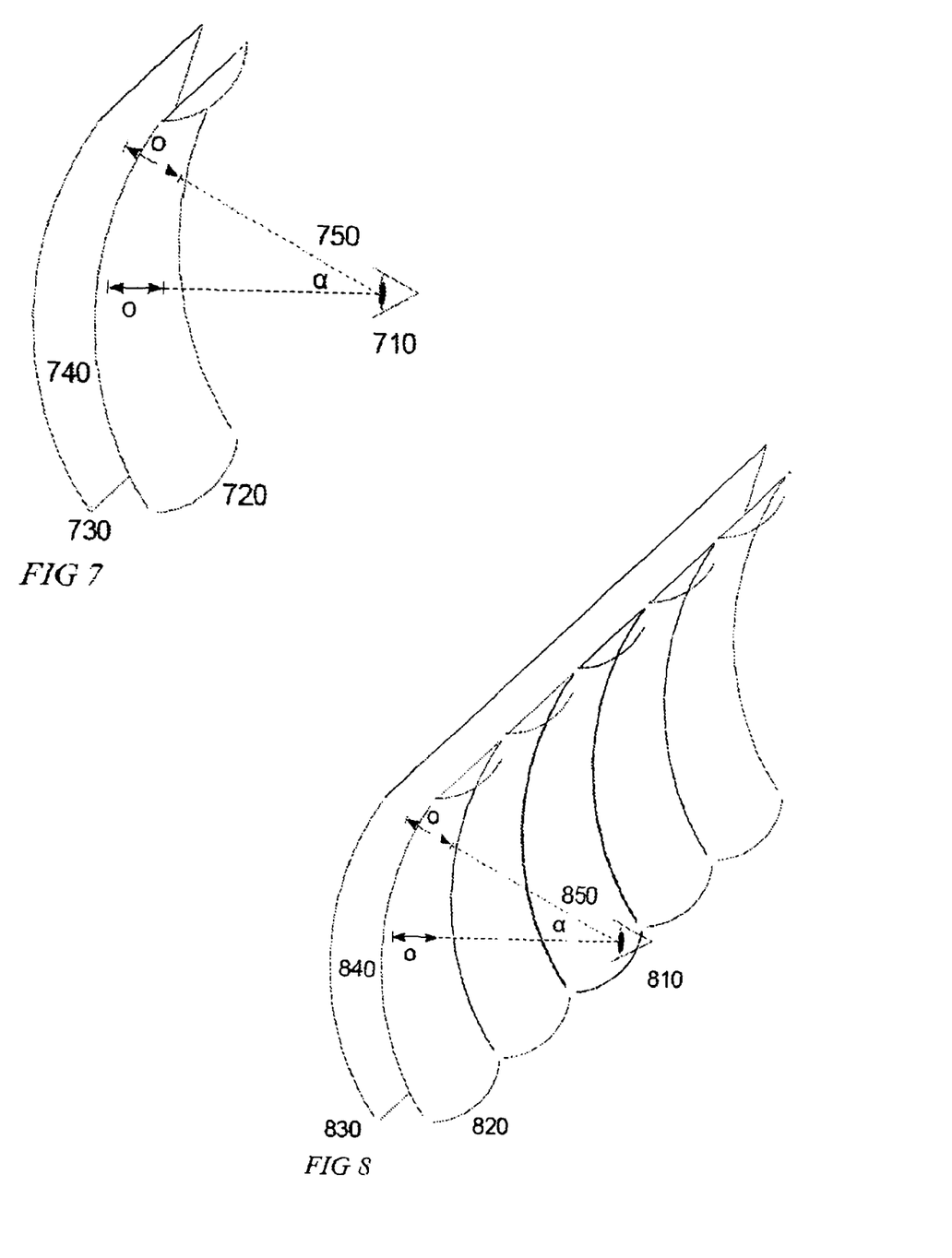
FIG. 7 is a perspective view of a single image on a backboard and a corresponding lens of an embodiment of the present invention, indicating the different distances from a viewer's horizontal line of sight and points along the backboard above and below the viewer's horizontal line of sight.
FIG. 8 is a perspective view of multiple adjacent images on a backboard and a corresponding cylindrical lenses of an embodiment of the present invention.

FIG. 7 and FIG. 8 schematically illustrate an embodiment of the present invention. As shown, a non-flat lensboard 720 or 820 and backboard 730 or 830 maintain the image quality at viewing angles 750 or 850 away from normal incidence. FIG. 7 illustrates a single lens 720 and image 740 pair. FIG. 8 illustrates several such pairs. The curved lensboard 720 or 820 and backboard 730 or 830 can maintain a more constant distance relative to prior art between a lens 720 or 820 and the image 740 or 840 viewed at a given angle 750 or 850. Though FIG. 7 illustrates a lensboard 720 and backboard 730 curve that is circular, the curve need not be circular, but could have other shapes that bring the edges of the image 740 closer to the viewer 710. In practice, any bringing forward of the edges that reasonably approximates a circle improves the image quality, though other shapes may reduce manufacturing or operational costs, for example a triangular cross section.

An embodiment of the present invention includes combining the improvements illustrated in FIG. 5, FIG. 7, and FIG. 8. For example, this embodiment can include a backboard that is curved in the manner of FIG. 7 and in which each image's cell is curved in the manner of FIG. 5.

Figure 9:
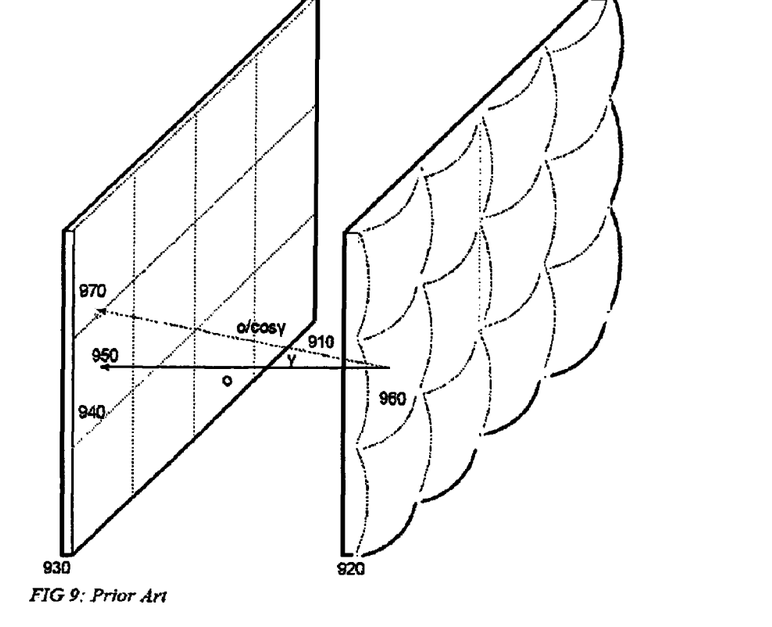
FIG. 9 is a perspective view of a zone of a prior art screen constituted by multiple adjacent columns of images and corresponding columns of spherical lenses.

FIG. 9 schematically illustrates a shortcoming of the prior art, that at different viewing angles 910 in any direction from the image center 950 the effective distance between an individual spherical lens 960 and the portion of the image 940 being viewed through that spherical lens 960 changes. In particular, if at normal incidence the distance between the lensboard 920 and the region 970 of the image 940 viewed at that angle 910 is o, then when angle 910 equals γ, the distance between the lensboard 930 and the region 970 of the image 940 viewed at that angle 910 is o/cos γ, which is greater than o for any nonzero γ. This change in distance with viewing angle 910 results in degradation of image quality. A given image 940 that appears in sharp focus or with a given magnification in front of the viewer may appear out of focus or with a different magnification away from the image center 950 in this embodiment.

Figure 10:
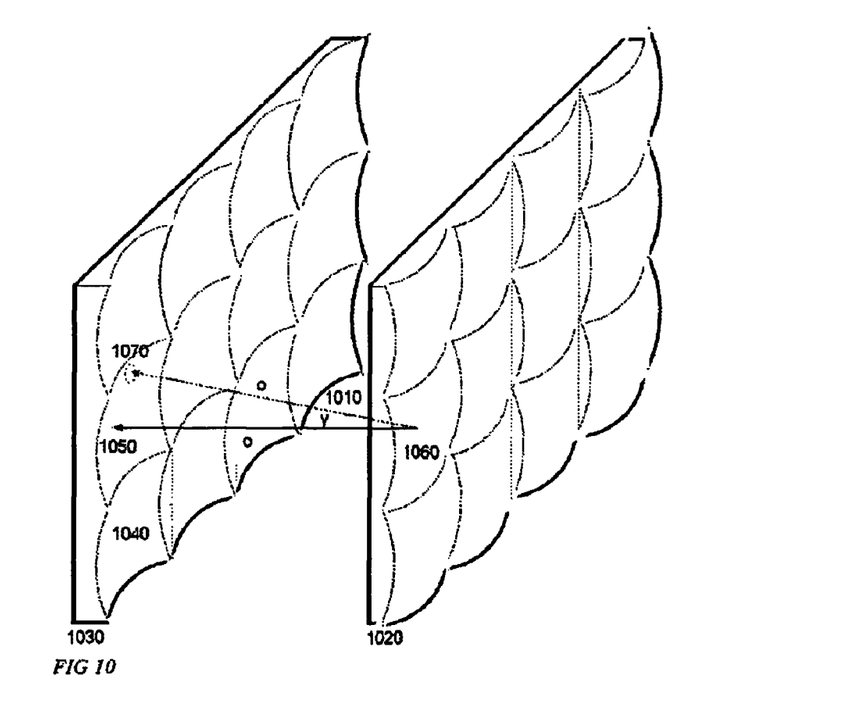
FIG. 10 is a perspective view of a zone of a screen embodiment of the present invention constituted by multiple adjacent columns of images and corresponding columns of spherical lenses, indicating the different distances from the lens center to points along the backboard away from the optical center in any direction.

FIG. 10 schematically illustrates an embodiment of the present invention, in which a non-flat backboard 1030 maintains the image quality at viewing angles 1010 away from normal incidence. The curved backboard 1030 can maintain a more constant distance between a lens 1060 and the region 1070 of an image 1040 viewed at a given angle 1010. Though FIG. 10 illustrates a backboard 1030 curve that is spherical, the curve need not be spherical, but could have other shapes that bring the edges of the image 1040 closer to the lensboard 1020. In practice, any bringing forward of the edges that reasonably approximates a sphere improves the image quality, though other shapes may reduce manufacturing or operational costs, for example a triangular cross section.

Figure 11:
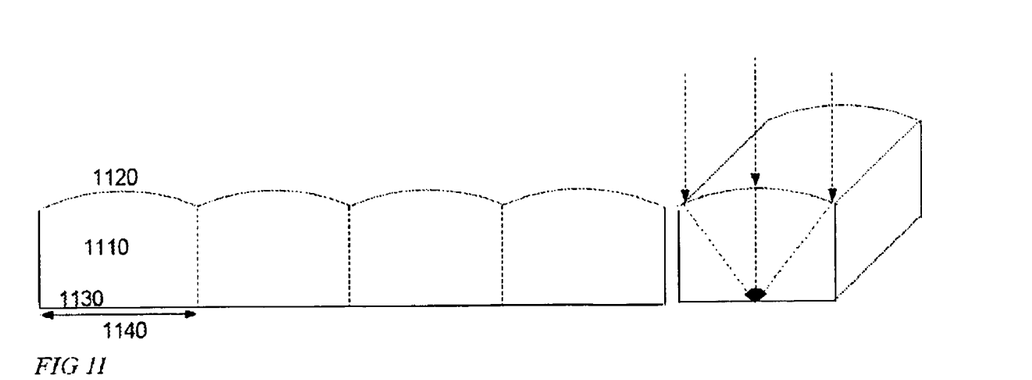
FIG. 11 illustrates two schematic views of an embodiment of the present invention in which an imageboard and lensboard are in contact.

FIG. 11 schematically illustrates an embodiment of the present invention, in which a lens 1110 is thick and fills the entire space between the surface 1120 facing the viewer and the backboard 1130. In this embodiment, the images 1140 abut the back face 1130 of the lens 1110 so that o=0. Having images 1140 abut the lens 1110 is useful because the image quality depends on the distance between the lens 1110 and the image 1140. When they abut, that distance is automatically maintained, reducing operational complexity. In FIG. 11, and apparent distance between the images 1140 and back face 1130 of lens 1110 is purely illustrative. In the actual apparatus they touch.

Known systems have a stretching effect that scales with the inverse of the distance between the lens and image. For such systems, the condition that o=0 implies an infinite stretching effect, which makes an impossibility of following the teaching of prior art. For example, o=0 makes solving the equation in row 35, column 5 in U.S. Pat. No. 2,833,176 (in which their N and M are equivalent to the present patent's o and D) for M impossible in prior art.

Figure 12:
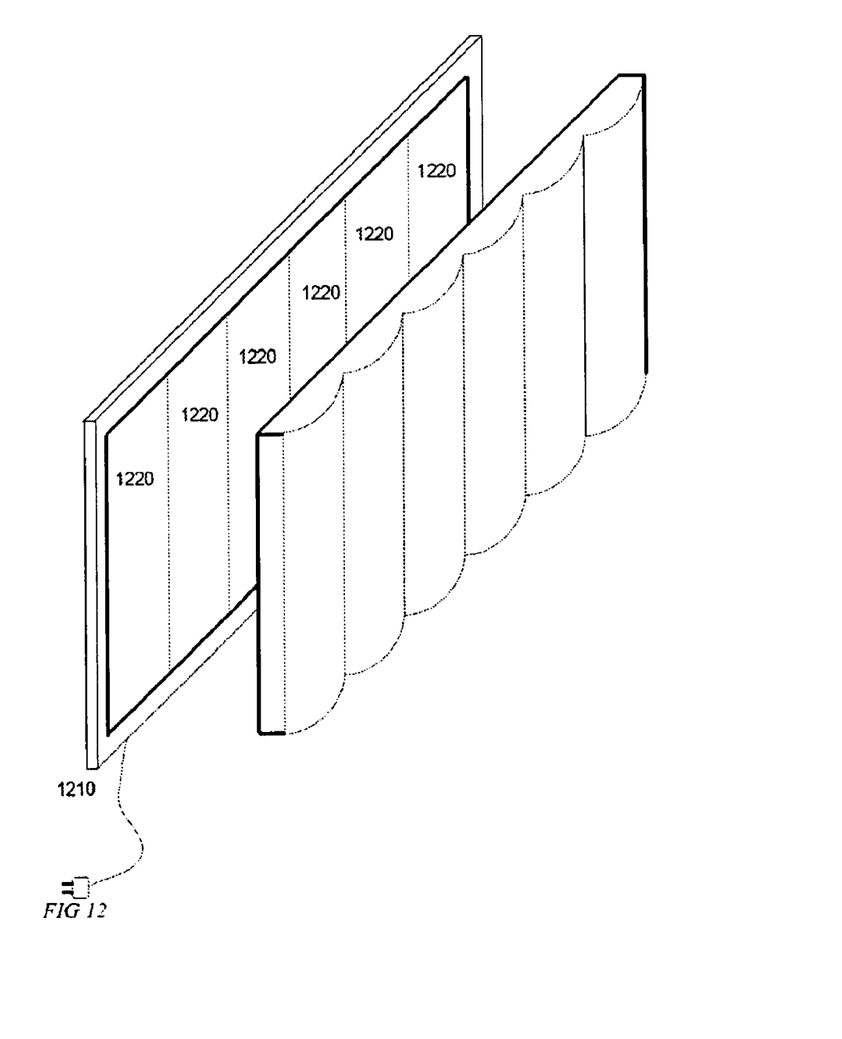
FIG. 12 is a perspective view of an embodiment of the present invention in which the backboard comprises a flat-screen monitor.

FIG. 12 schematically illustrates an embodiment of the present invention, in which the backboard 1210 comprises a conventional display screen and the series of images 1220 is shown on it. Such an arrangement offers several useful advantages, for example that the series of images 1220 can be changed without mechanically removing material objects, reducing operational complexity. Care must be taken regarding resolution. Some conventional display screens, particularly digital monitors, generally have lower resolution than printed images and both the magnification and stretching effects effectively reduce the apparent resolution in the direction of motion. For example, a monitor with an actual resolution of 50 pixels per inch in an apparatus of the present invention with a magnification of 2 will appear through the present invention at the optimal viewing distance to have an apparent resolution in the direction of motion of 25 pixels per inch. The resolution in the non-magnified direction will appear unchanged.

Figure 13:
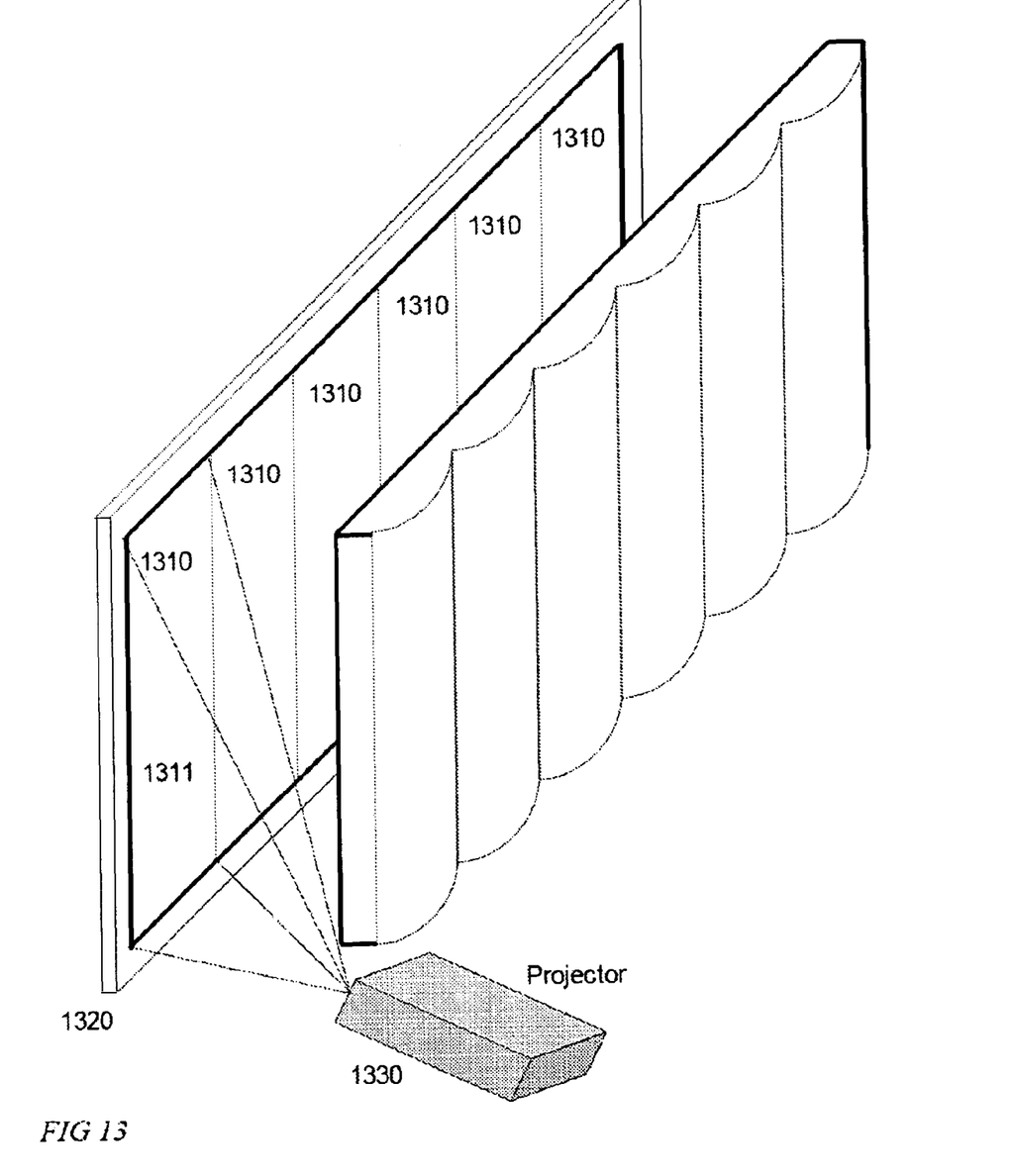
FIG. 13 is a perspective schematic view of an embodiment of the present invention in which the images are projected onto the backboard from a projector.

FIG. 13 schematically illustrates an embodiment of the present invention, in which the series of images 1310 are projected onto the backboard 1320 by a projector 1330, which may be digital or analog. For simplicity, FIG. 13 shows only one projector 1330, for the leftmost image 1311. An actual embodiment would require multiple projectors, generally one per image, although one projector could project multiple images or fractions of images. As with monitors, care must be taken regarding resolution in the case of digital projectors. A projector's 1330 actual projected resolution at the backboard 1320 will result in an lower apparent resolution in the direction of the viewer's motion. While FIG. 13 illustrates the projected image 1311 being projected from the front of the backboard 1320, those skilled in the art will recognize that some or all of the images 1310 could be projected from the rear of the backboard 1320 and still fall within the scope of the various embodiments of the present invention.

Figure 14:
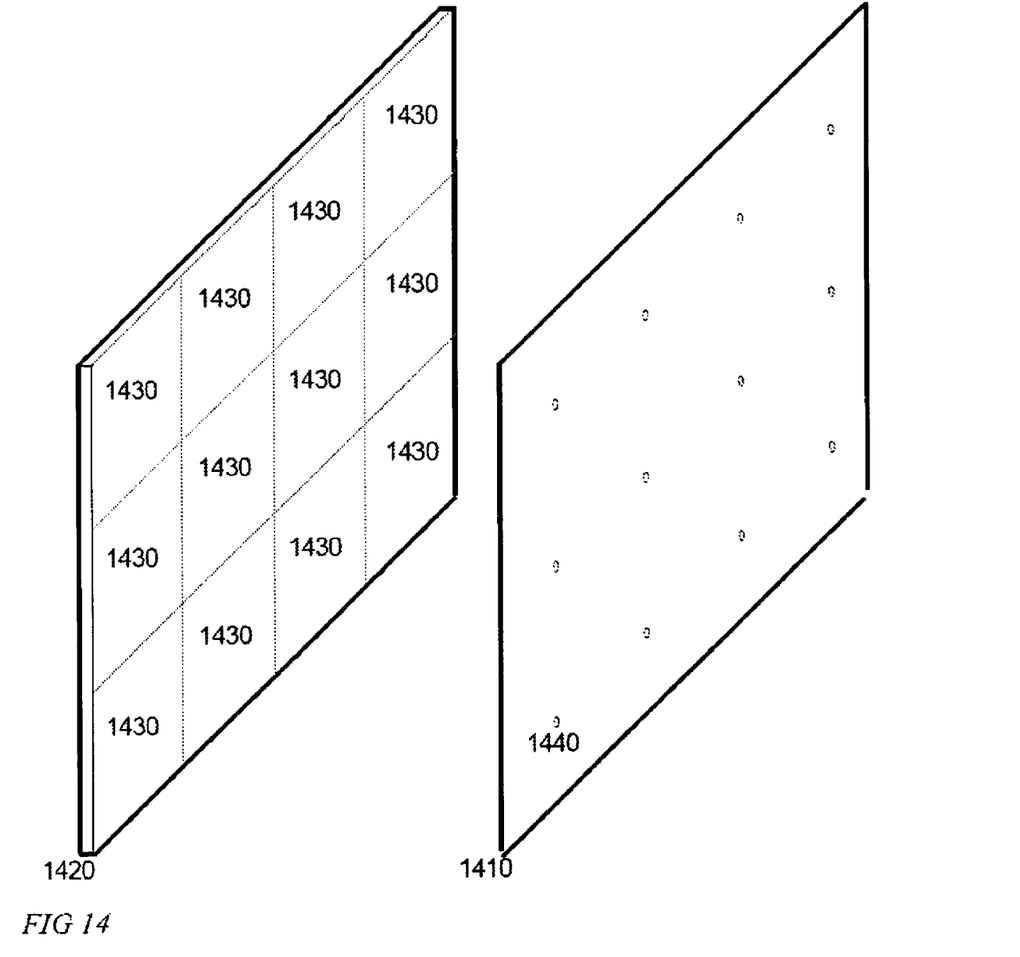
FIG. 14 is a perspective schematic view of an aperture-based zoegraph that shows animation in more than one direction in accordance with some embodiments of the present invention.

FIG. 14 schematically illustrates an embodiment of the present invention, in which a pinholeboard 1410 is placed between the viewer and an image-conveying backboard 1420. In this embodiment, the pinholeboard 1410 operates in similar fashion as the various lensboard embodiments discussed above. In a preferred embodiment, pinholeboard 1410 is composed of 26 gauge or thinner sheet stainless steel painted black or a dark color, with the pinholes laser-cut to a radius of 0.5 millimeter. This embodiment provides a good combination of strength, durability, field of view, precision, image contrast, and manufacturing facility.

As illustrated, the pinholeboard 1410 comprises a number of pin holes. Preferably, the number of pinholes is provided such that a one to one correspondence exists between pinholes and images on backboard 1420. In some embodiments, pinhole density can vary as long as the image density varies in sync, maintaining the one-to-one correspondence. Indeed, in some embodiments, pinholes can have any density spacing across the pinholeboard 1410. In practice density is limited mainly by two things: printing resolution used to provide images on the backboard 1420 and backboard 1420 brightness. Printing resolution limits are generally as follows: as pin hole density increases, image size decrease. This means images need increased magnifications, which in turn provides viewers a lower effective resolution (e.g., 10× magnification means ⅒ resolution). Brightness limits are generally as follows: as pinhole density decreases, the less light gets through the pinholeboard 1410, meaning illumination is brighter.

Figure 15:
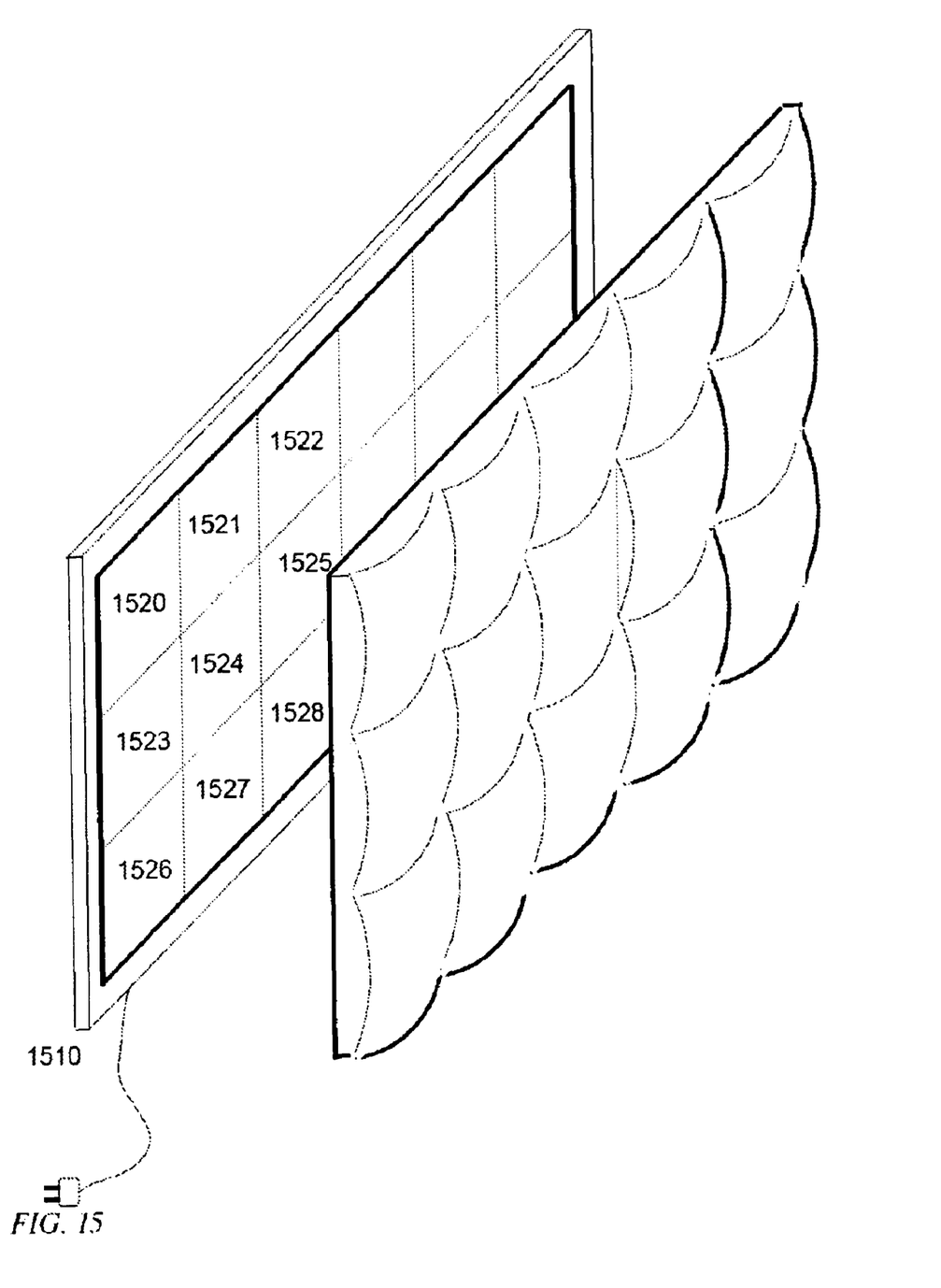
FIG. 15 is a perspective schematic view of an embodiment of the present invention in which a backboard comprises a flat-screen monitor display adjacent columns of images corresponding to columns of spherical lenses.

FIG. 15 schematically illustrates an embodiment of the present invention in which a backboard 1510 comprises a display screen. As shown, a series of images 1520-1528 are provided on the backboard 1510. Such an arrangement offers several useful advantages to show 3D animations. This embodiment displays 3D animations as follows. Consider image 1524, which shows an image to a viewer substantially in front of the corresponding lens. Image 1521 shows an image to a viewer substantially in front of it, which is substantially just above the position to view image 1524. Likewise, image 1523 shows an image to a viewer substantially just to the left of the position to view image 1524, and similarly for all images 1520, 1521, 1522, 1523, 1525, 1526, 1527, and 1528 about image 1524. If the subject shown in images 1520-1528 is the same, but from perspectives corresponding to perspectives differing by substantially the same amounts of the optimal viewing points of images 1520-1528, the subject will appear three dimensional. If, furthermore, the images 1520-1528 displayed by the backboard 1510 were themselves animated, they would collectively appear as a three dimensional animation. The animation could be, for example created by a computer in real time as part of a video game. The 3D animation effect does not require a spherical lens zoegraph and could also be achieved with a cylindrical lens zoegraph.

Figure 16:
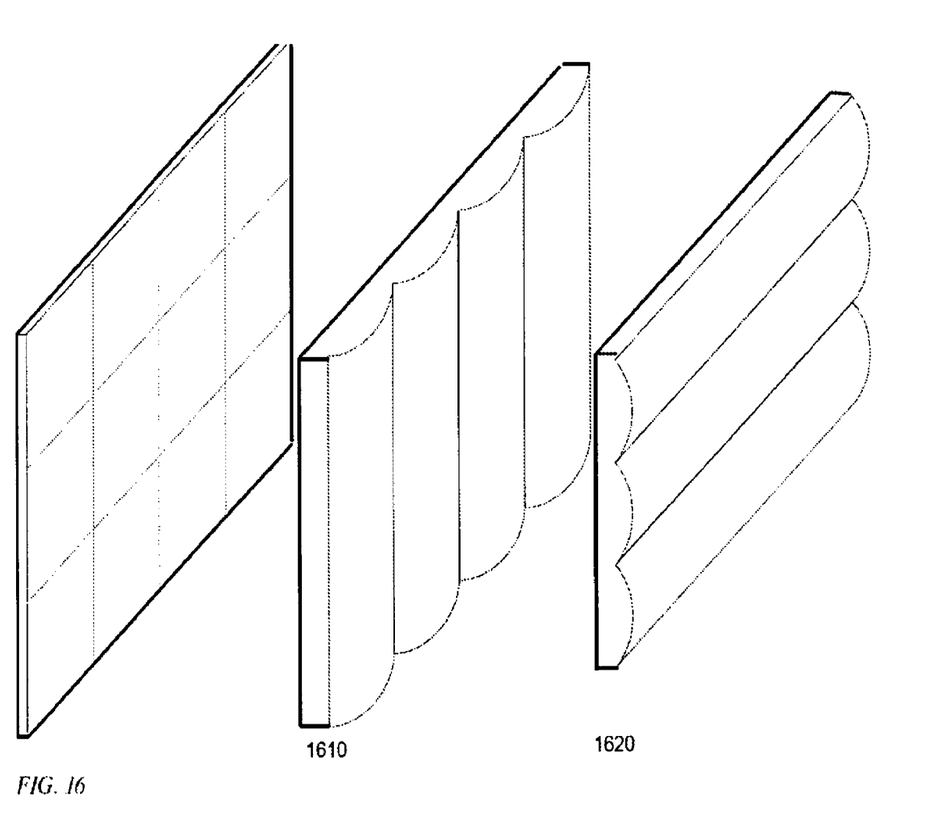
FIG. 16 is a perspective schematic view of an embodiment of the present invention in which a lensboard acts as a spherical lensboard but comprises two cylindrical lensboards.

FIG. 16 schematically illustrates an embodiment of the present invention in which two cylindrical lensboards 1610 and 1620, oriented substantially perpendicularly to each other, act as a single spherical lensboard. FIG. 16 shows a substantial distance between lensboards 1610 and 1620, which would require each to have its own focal length and magnification for the apparatus to have a single optimal viewing distance. It is generally advantageous to have both lensboards 1610 and 1620 to be as close as possible. In practice this positioning allows them to have the same focal length. This configuration reduces costs by allowing an extra use of lenticular lensboards manufactured for other configurations.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

We claim:

1. Apparatus for displaying images to viewers, the apparatus comprising:
   a backboard configured to carry one or more static or dynamic images; and
   an optics board comprising one or more optical elements, each of said optical elements having a one-to-one correspondence with one of the one or more static or dynamic images, the optics board set off from the backboard at a distance less than the focal distance of the one or more optical elements.

2. The apparatus of claim 1, wherein the optics board is one of a lensboard comprising one or more cylindrical lenses as the optical elements or a pinhole board comprising one or more pinholes as the optical elements.

3. The apparatus of claim 1, the backboard configured to be curved horizontally, vertically, or a combination thereof and the optics board configured to have a curvature corresponding to the backboard.

4. The apparatus of claim 1, further comprising an internet network interface to provide images to the backboard such that the images can be changed at a location remote from the backboard.

5. The apparatus of claim 1, the optics board comprising one or more lenses having a non-circular cross-section as the one or more optical elements.

6. The apparatus of claim 2, the one or more cylindrical lenses being configured as columns of spherical lenses and the one or more static or dynamic images being configured as columns of images.

7. The apparatus of claim 1, wherein the distance between the backboard and the optics board is substantially zero.

8. An image display system comprising:
   an image source configured to present one or more images outwardly from the image source; and
   a lensboard comprising one or more cylindrical lenses, the one or more lenses having a focal distance, the lensboard being spaced apart from the image source at a distance less than the focal distance, and each of the one or more lenses having a one-to-one correspondence with one of the one or more images presented outwardly from the image source.

9. The image display system of claim 8, the image source being at least one of a static or a dynamic image.

10. The image display system of claim 8, the image source comprising a display screen and being operatively coupled to a network and configured to receive image information from the network for display on the display screen.

11. The image display system of claim 8, the image source being connected to the internet such that images displayed outwardly from the image source can be modified at a location remote from the image source.

12. The image display system of claim 8, the image source configured to project images stored in a local memory such that images directed outwardly from the image source can be controlled at the image source.

13. The image display system of claim 8, the lensboard further comprising one or more lenses having a non-circular cross-section.

14. The image display system of claim 8, the lensboard further comprising a plurality of curved lenses having at least one of a circular cross section or elliptical cross section.

15. The image display system of claim 8, the image source being curved in a horizontal configuration, vertical configuration, or a combination thereof.

16. Apparatus for displaying images to viewers comprising:
   a backboard having a front backboard side, the backboard configured to carry one or more images;
   a lensboard situated an object distance away from the front backboard side of said backboard and comprising a plurality of cylindrical lenses each of said lenses having a one to one correspondence to one of the one or more images; and
   said lensboard having a front lensboard side, a rear lensboard side and a focal plane located a focal distance from the appropriate principal plane contained within the lensboard, said focal distance being greater than said object distance.

17. The apparatus according to claim 16, wherein said plurality of lenses are cylindrical lenses.

18. The apparatus according to claim 16, wherein said plurality of lenses are elliptical lenses shaped to reduce or eliminate aberrations.

* * * * *